(12) United States Patent
Schneider et al.

(10) Patent No.: US 11,988,224 B2
(45) Date of Patent: May 21, 2024

(54) FAN AND FAN BLADES

(71) Applicant: ebm-papst Mulfingen GmbH & Co. KG, Mulfingen (DE)

(72) Inventors: Marc Schneider, Dörzbach (DE); Andreas Lucius, Schwäbisch Hall (DE); Marius Lehmann, Niedernhall (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 17/941,566

(22) Filed: Sep. 9, 2022

(65) Prior Publication Data

US 2024/0084815 A1   Mar. 14, 2024

Related U.S. Application Data

(62) Division of application No. 17/910,406, filed as application No. PCT/EP2021/055473 on Mar. 4, 2021.

(30) Foreign Application Priority Data

Mar. 10, 2020 (DE) .......................... 102020106534.5

(51) Int. Cl.
- *F04D 29/28* (2006.01)
- *F04D 29/32* (2006.01)
- *F04D 29/38* (2006.01)

(52) U.S. Cl.
CPC ........... *F04D 29/38* (2013.01); *F04D 29/281* (2013.01); *F04D 29/325* (2013.01)

(58) Field of Classification Search
CPC ....... F04D 29/325; F04D 29/281; F04D 29/38
See application file for complete search history.

(56) References Cited

U.S. PATENT DOCUMENTS

| | | |
|---|---|---|
| 2,649,921 A | 8/1953 | Faber |
| 3,416,725 A | 12/1968 | Bohanon |
| 4,089,618 A | 5/1978 | Patel |
| 5,533,865 A | 7/1996 | Dassen et al. |
| 5,603,607 A | 2/1997 | Kondo et al. |
| 6,431,498 B1 | 8/2002 | Watts et al. |
| 7,261,513 B2 | 8/2007 | Umeyama et al. |
| 9,249,666 B2 | 2/2016 | Wood et al. |

(Continued)

FOREIGN PATENT DOCUMENTS

| | | |
|---|---|---|
| CN | 107023515 A | 8/2017 |
| CN | 110701100 A | 1/2020 |

(Continued)

OTHER PUBLICATIONS

International Search Report (English) of the International Searching Authority issued in PCT/EP2021/055473, dated May 17, 2021; ISA/EP.

(Continued)

*Primary Examiner* — Sabbir Hasan
(74) *Attorney, Agent, or Firm* — Harness, Dickey & Pierce, P.L.C.

(57) ABSTRACT

A fan blade (1) has a front inflow edge (2) and a rear outflow edge (3). The fan blade (1) also has an at least partially wavy inflow edge (4), that forms a wave (W) having a specific three-dimensional waveform.

9 Claims, 8 Drawing Sheets

(56) References Cited

U.S. PATENT DOCUMENTS

| | | | |
|---|---|---|---|
| 9,869,324 | B2 | 1/2018 | Shiraichi et al. |
| 9,951,626 | B2 | 4/2018 | Gruber et al. |
| 10,301,942 | B2 | 5/2019 | Joseph et al. |
| 10,400,605 | B2 | 9/2019 | Nakashima et al. |
| 11,022,139 | B2 | 6/2021 | Froh et al. |
| 11,149,551 | B2 * | 10/2021 | Teramoto ............... F01D 5/141 |
| 2003/0152459 | A1 | 8/2003 | Gliebe |
| 2010/0164488 | A1 | 7/2010 | Lowe et al. |
| 2014/0023501 | A1 | 1/2014 | Ikeda et al. |
| 2014/0072435 | A1 | 3/2014 | Choi et al. |
| 2015/0152875 | A1 | 6/2015 | Kamiya et al. |
| 2016/0010656 | A1 | 1/2016 | Shiraichi et al. |
| 2018/0030996 | A1 * | 2/2018 | Schilling ............... F04D 29/388 |
| 2019/0024674 | A1 | 1/2019 | Loercher et al. |
| 2019/0226492 | A1 | 7/2019 | Krishnaswami et al. |
| 2020/0040736 | A1 | 2/2020 | Teramoto et al. |
| 2021/0340992 | A1 | 11/2021 | Yuan et al. |

FOREIGN PATENT DOCUMENTS

| | | | |
|---|---|---|---|
| DE | 3137554 A1 | 3/1983 | |
| DE | 19948075 A1 | 5/2000 | |
| DE | 10326637 B3 | 1/2005 | |
| DE | 102009044824 A1 | 6/2010 | |
| DE | 102013216575 A1 | 2/2015 | |
| DE | 102015216579 A1 | 3/2017 | |
| DE | 102017212231 A1 | 1/2019 | |
| EP | 1801422 A2 | 6/2007 | |
| EP | 3121376 A1 * | 1/2017 | ............ F01D 5/141 |
| EP | 3121376 B1 | 9/2017 | |
| EP | 3617528 A1 | 3/2020 | |
| FR | 2513324 A1 | 3/1983 | |
| GB | 2497739 A | 6/2013 | |
| JP | 2003232295 A | 8/2003 | |
| JP | 2003278696 A | 10/2003 | |
| JP | 2015-063912 A | 4/2015 | |
| JP | 5978886 B2 | 8/2016 | |
| JP | 2017110555 A | 6/2017 | |
| JP | 6409666 B2 | 10/2018 | |
| WO | WO-1998005868 A1 | 2/1998 | |
| WO | WO-2013180296 A1 | 12/2013 | |
| WO | WO-2018211270 A1 | 11/2018 | |

OTHER PUBLICATIONS

"Waveform"; Mar. 28, 2019; Wikipedia (Year: 2019).
U.S. Appl. No. 17/910,406, filed Sep. 9, 2022, Marc Schneider.
U.S. Appl. No. 17/910,461, filed Sep. 9, 2022, Marc Schneider.
U.S. Appl. No. 17/941,501, filed Sep. 9, 2022, Marc Schneider.

* cited by examiner

FAN AND FAN BLADES

CROSS-REFERENCE TO RELATED APPLICATIONS

This application is a divisional of U.S. Ser. No. 17/910,406, filed Sep. 9, 2022 which claims priority of International Application No. PCT/EP2021/055474, filed Mar. 4, 2021, which claims priority to German Application No. 102020106534.5, filed Mar. 10, 2020. The entire disclosures of the above applications are incorporated herein by reference.

FIELD

The present disclosure relates to a fan and a fan blade, in particular for a radial fan.

BACKGROUND

Fans are used, for example, in heat exchangers for suction via the exchanger assembly. However, the inflow to the fan is thus strongly turbulent. The turbulent inflow to the fan results in a significant increase of the sound emission, this means annoying noise generation. The degree of turbulence Tu and the so-called turbulent length dimension A can be metrologically determined to characterize the inflow. The degree of turbulence is the ratio of the fluctuation value of the speed to the mean value. The turbulent length dimension is the average dimension of the turbulent structures. It corresponds to the path length over which speed fluctuations are correlated with one another. The heat exchanger is essentially constructed from pipes with fins.

In current fans or fan wheels, fluidically favorably formed ventilator fans enable a high performance, in particular, with respect to the achieved through flow volume or the pressure buildup. In principle, there is a demand for low-noise fans, at the same time, with good aerodynamics in spite of turbulent incident flow. However, strong noise generation in operation of a fan often remains problematic. The noises arise when the turbulent inflow strikes the ventilator fan.

There are diverse design measures to reduce these problems in the prior art. Document DE 19948075 A uses an axial fan with blades that have a double-sickled, leading fan edge having a protruding outer corner to reduce the running noise. U.S. Pat. No. 3,416,725 A discloses a blade shape with a double-sickled inflow edge and a lightly single-sickled outflow edge.

DE 10326637 B3 describes a further solution, namely a fan with alternating rotational direction, that has S-shaped sickled blades with the inflow edge receding strongly outward. WO 1998005868 A1 discloses a numeric method for aero-acoustic optimization of an axial fan or its blade geometry. U.S. Pat. No. 2,649,921 provides a fan with very short and wide blades and triple-curved inflow and outflow edges. Furthermore, U.S. Pat. No. 5,533,865 A discloses a rotor for a windmill. Here, the blades have sawtooth-shaped outflow edges. Jagged or wavy outflow edges are used to reduce the outflow edge sound (for example, GB 2497739 or EP 1801422 A2). DE 102009044824 A1 uses porosities, in the form of holes in the region of the outflow edge, to reduce the sound occurring at the outflow edge.

In the case of turbulent inflow, the sound that arises at the outflow edge is of subordinate importance in relation to the sound occurring at the inflow edge.

Wavy or jagged inflow edges are also known to reduce the noise in the event of turbulent inflow. U.S. Pat. No. 6,431,498 B1 describes a wavy inflow edge that results due to various cuts in the spanwise direction. The front region is extended up to the thickness maximum in the chord-wise direction. U.S. Pat. No. 9,249,666 B2 describes an alternative design of the wave on the inflow edge, where the profile is not extended in the chord-wise direction, but rather leaves the reference profile to the pressure side or to the suction side. A special inflow edge wave, in the form of a double sine, is described in EP 3121 376 B1. WO2013/180296 uses jagged inflow edges with triangular shape. Document DE 102017212231 A1 describes a combination of wavy inflow edge with wavy outflow edge. The waves on the inflow edge have greater wavelengths in comparison to the outflow edge.

The wave trough is an important location of the occurrence of sound in wavy or jagged inflow edges. Further documents relate to modifications of the blade in the region of the trough. JP6409666B2 uses additional guiding elements on the blade in the region of the trough. A recess of the jagged inflow edge in the trough is described in JP5978886B2.

SUMMARY

Against this technical background, the disclosure relates to the problem of providing a fan or fan blade that operates with low noise in particular in the event of turbulent inflow, and at the same time, has good aerodynamic properties.

The disclosure solves this problem using a fan according to the independent claims. The dependent claims contain advantageous embodiments.

Before the disclosure is described in more detail, several concepts and the terminology used will be explained for better comprehension of the disclosure. A typical axial and diagonal fan is considered, usually having multiple fan blades arranged in a star shape on a central hub, for the fluidic suction and/or compression of the air surrounding the fan or a gas to be conveyed by the fan. The fan blades can be connected to one another by a circumferential ring at the radial outermost profile surface.

Furthermore, each fan blade has a front inflow edge, that leads in operation in the intended rotational direction, and a rear outflow edge, that trails in operation of the fan in the intended rotational direction. Furthermore, depending on the rotational direction and the fan blade profile, there is a suction side and a pressure side. The suction side is typically located on the convex side and the pressure side is typically located on the concave side of the fan blade. The fan blade thus has a suction side, that suctions in the inflowing air in operation, and a pressure side, opposite to the suction side, where the pressure for expelling the air builds up.

The fan according to the disclosure is distinguished in relation to a comparable conventional fan by a noise-reduced operation in the event of turbulent inflow. As already mentioned above, a fan according to the disclosure uses at least one fan blade according to the disclosure, where this fan blade achieves a noise production reduced in relation to comparable conventional fans by a special design.

The mechanism of the increased occurrence of sound is based on the turbulent inflow connected to a temporal change of the inflow of the fan. The turbulence results in temporal variations of the forces occurring on the blade, due to a triggered corresponding fluctuating sound emission. The intensity of such fluctuations is of particular importance. The higher the degree of turbulence in the inflow and thus the fluctuations of the relevant flow variables in the inflow of the fan, the more strongly a sound emission is produced or, in other words, the louder the operation of such a fan is perceived.

Studies of diverse modifications of front-side inflow edges of blade profiles in turbulent inflow display positive acoustic effects when the inflow edge is embodied as wavy or having a wave-like serrated form. It was possible to recognize according to the disclosure that the essential mechanism that results in reduction of the emitted sound emission is that a decorrelation of the sources takes place on the blade. A turbulent inflow appears chaotic, but is not completely chaotic, but rather correlates with geometric factors. The above-mentioned length dimension A is the path length over which a specific correlation of the turbulent fluctuations can be established.

However, studies have shown that acoustically active wavy inflow edges have aerodynamically worse properties. Thus, one skilled in the art is initially deterred from designing such forms. The present disclosure is directed to a specific design of the inflow edge wave that is acoustically and aerodynamically advantageous. This is because it has been shown according to the disclosure that the formation of a very specific waveform is particularly advantageous.

One basic concept of the disclosure is that the inflow, at least in sections, has a specific three-dimensional wavy form or is made three-dimensionally wavy. The special form of the wave differs significantly from the prior art. It is furthermore advantageous if the wavy inflow edge is furthermore embodied having a porosity. According to the disclosure, a fan blade with an inflow edge and an outflow edge is provided, where the fan blade has, at least in one section, a wavy inflow edge with a periodically repeating waveform of the period length $\lambda$, which is different from a sinusoidal or nearly sinusoidal waveform. In particular it is different from a sinusoidal or nearly sinusoidal waveform having equal period length $\lambda$.

In a regularly repeating physical occurrence, the period (period length) is the smallest position distance after which the occurrence repeats.

It is furthermore advantageous if the wavy inflow edge has two or more periodically repeating waveforms. The effect according to the disclosure occurs when the desired waveform is formed over multiple periods.

Wave troughs and wave peaks can thus be formed alternately on the front edge, i.e., along the inflow edge, in a specific periodicity.

The optimum range of wavelength and amplitude provide both aerodynamic and acoustic improvements at the same time. The so-called peak-trough value H of the wave is the distance from the highest point to the lowest point. For a focus on the reduction of the sound power, waves with greater height (large peak-trough value H) and smaller wavelengths tend to be used (small $\lambda/H$). For a reduction of the input power, small peak-trough values H and larger wavelengths are advantageous (greater $\lambda/H$). With respect to the impeller diameter D, preferred peak-trough values H in the range of $0.01 \leq H/D \leq 0.1$ are advantageous.

In a corresponding advantageous embodiment of the disclosure, the peak-trough value H of the wave troughs is defined from the front edge, in this region of the wavy inflow edge, to the respective wave trough (viewed in the flow direction). Values for the ratio between the period length $\lambda$ and the peak-trough value H are in the range of $0.2 \leq \lambda/H \leq 2$, where the values can vary along the inflow edge.

A solution has proven to be particularly effective where a waveform differing from a sine form has deeply-cut wave troughs in each period, i.e., sufficiently strongly pronounced wave troughs, The amplitude or the peak-trough value is to have a specific value in relation to the chord length of the fan blade. Lightly pronounced or only sinusoidal wave troughs have been shown to be inadequately effective. Rather, the peak-trough value of the wave troughs in the region of the wavy inflow edge is preferably to be approximately 10%-30% of the chord length SL, more preferably 10% to 20% of the chord length SL. In relation to the imaginary sine wave with equal number of periods, the peak-trough value is therefore to be greater, which results in steeper flanks in relation to the flow direction in the wave trough.

It is therefore preferred if the repeating waveform forms at least one wave trough with two "steep" wave flanks extending toward one another and each obliquely to the flow direction per period. It is particularly advantageous here if the (lateral) wave flanks extending obliquely to the wave trough in this region of the inflow edge (in particular in a section close to the flanks entered) extend in relation to the flow direction at a tangential angle $\beta$ between 15° and 35°, preferably a tangential angle $\beta$ of 25° to 30°.

This also causes a significantly stronger curvature progression in the wave troughs of a waveform according to the disclosure in relation to the curvature progression in a sinusoidal wave trough.

In a further alternative exemplary embodiment, the repeating waveform (i.e., the waveform that is arranged periodically) forms two adjacent wave troughs with a wave peak located in between, that extends against the flow direction in the direction of the inflow-side front edge. The two lateral flanks that delimit the waveform extend obliquely, as explained above.

According to the disclosure, the following process can be used for the design of the wave. Namely, the waveform in the region of the wavy inflow edge extends at least in sections or completely through multiple, in particular six common points of intersection (support points) with an imaginary sine wave, but differs in its shape from a sine wave.

In the alternative exemplary embodiment, where a wave peak is located between two wave troughs, the peak-trough value h2 of such a wave peak is approximately 10% to 80% in absolute value of the peak-trough value H of the directly adjacent wave peak(s).

In addition, it is advantageous to adapt the wavy inflow edge locally to the flow approximately in the middle of a period, i.e., at half wavelength. An offset of the inflow edge perpendicular to the center line between pressure side and suction side of the blade is introduced. This offset improves the inflow of the inflow edge and helps to avoid flow separations in this region. This offset is preferably embodied in the direction of the pressure side. It is insofar advantageous if the blade profile has a specific, in particular wavy structure in specific sections in addition to the wavy inflow edge. For this purpose, the blade profile (viewed in a profile section in the region of a wave peak) can respectively form a bump protruding on the suction side (SS) and a dent at the corresponding opposing position of the pressure side (DS). The surface profile is defined in each case so that the surface curvature changes twice viewed in the flow direction. If the surface profile on the upper side (suction side) approximately corresponds to the opposing surface profile on the lower side (pressure side), the blade profile has an approximately uniform thickness, but bulges somewhat on the suction side.

A further improvement can be that the blade profile curves farther toward the pressure side frontally in the region of the inflow edge (viewed in a profile section) in comparison to the or a region adjacent thereto curved less toward the pressure side. A specific additional wavy structure of the blade is thus achieved, preferably with a spacing of one period, more preferably from period center to period center.

An additional improvement of the noise behavior can be achieved in that the fan blade is formed in the region of the inflow edge with a plurality of continuous channels through the fan blade from the pressure side to the suction side (region having porosity). Due to the use of porosities in the region of the blade edges interacting with the turbulence, a further reduction of the sound emission can be achieved. The porosities can be formed by holes or by slots. These are through openings, that enable a pressure equalization between the suction side and the pressure side of the fan blade. The hole diameter or the width of the slots assumes values in a range up to approximately 2 mm in one preferred embodiment. The porous region preferably comprises only a section of the inflow edge, where the section is less than up to approximately 20% of the blade length.

A combination of multiple geometric design elements according to the disclosure is particularly advantageous, where the special features specific to the disclosure are to be taken into consideration in each case. Thus, for example, a combination of porosity and three-dimensionally formed wave in the region of the inflow edge is possible.

The present disclosure relates, in particular, to an axial or diagonal fan, that has one or more above-described fan blades.

Other advantageous refinements of the disclosure are included in the dependent claims or are described in more detail hereinafter together with the description of the preferred embodiment of the disclosure on the basis of the figures.

DRAWINGS

DETAIL DESCRIPTION

The disclosure is explained in more detail hereinafter on the basis of an exemplary embodiment with reference to FIGS. 1 to 8. Identical reference signs in the figures indicate identical structural and/or functional features.

Figure 1:
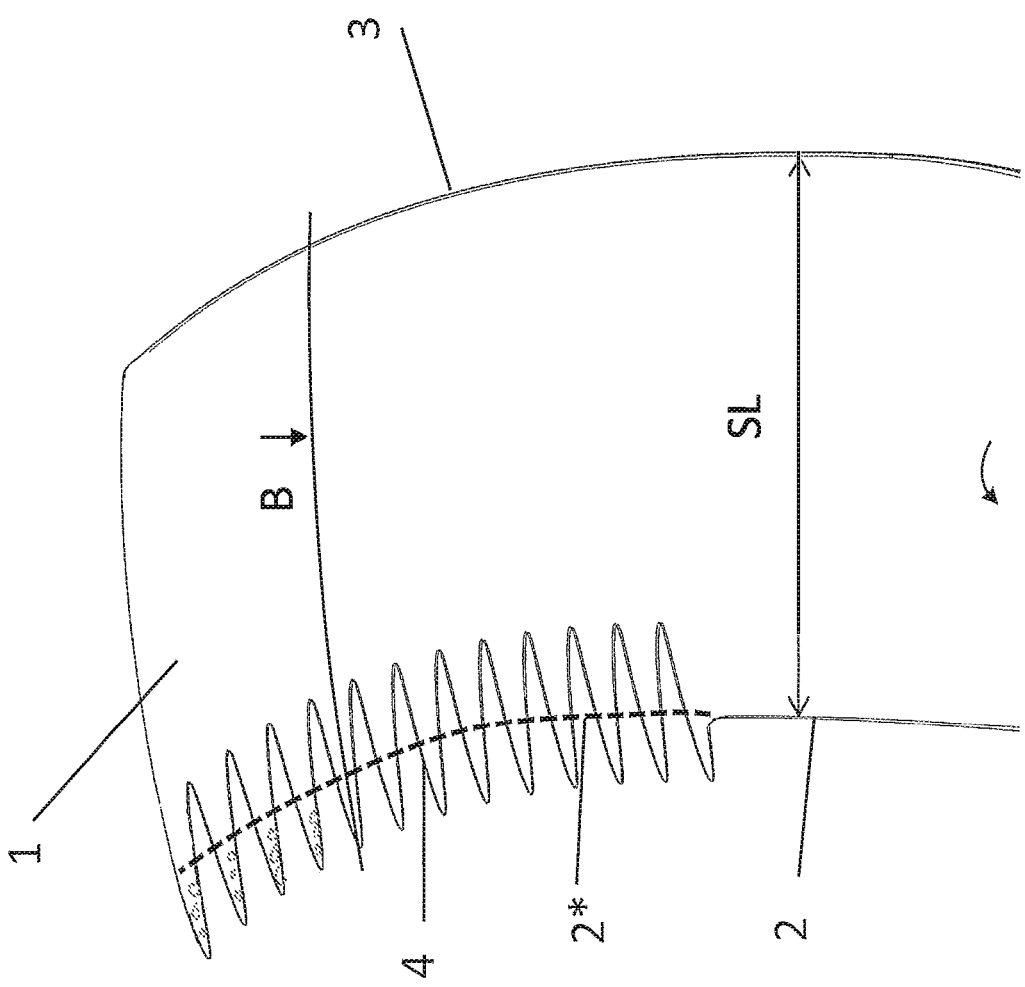
FIG. 1 is a perspective view a fan blade with wavy inflow edge in sections.

FIG. 1 shows a fan blade 1 with an inflow edge that is wavy in sections. The fan blade 1 has an inflow edge 2, 4 and an outflow edge 3. An at least partially wavy region, on the inflow edge, is identified by inflow edge 4. This region of the inflow edge 4 forms a wave of a specific waveform. The inflow edge of a reference blade without a wavy inflow edge is identified by 2*. The reference blade represents a non-optimized blade without the features of the present disclosure.

In addition, two circumferentially extending profile section lines A and B are shown. The position of the profile section A is selected so that the chord length of the fan blade 1 having the wavy inflow edge 4 approximately corresponds to the chord length of a reference blade having a non-wavy inflow edge 2*. The position of the profile section B is selected so that it extends through a wave peak of the fan blade 1 with the wavy inflow edge 4.

Figure 2:
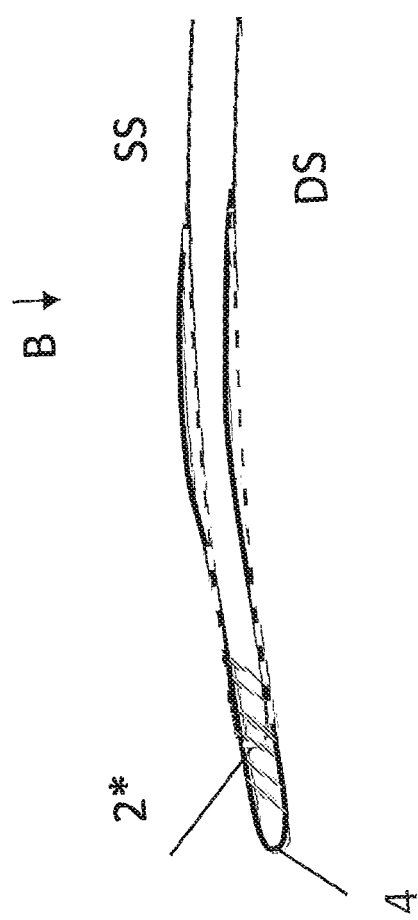
FIG. 2 is a detail cross-section view of a profile section B through the fan blade in the peak of the inflow edge wave to explain the specific "S-waviness"

FIG. 2 is a detail view of the profile section B in the wavy region of the inflow edge 4 of the fan blade 1 to explain an S-shaped wave. The profile having the wavy inflow edge 4 leaves the reference profile having the non-wavy inflow edge 2* close to the inflow edge in the direction of pressure side DS and further downstream in the direction of suction side SS.

Figure 3:
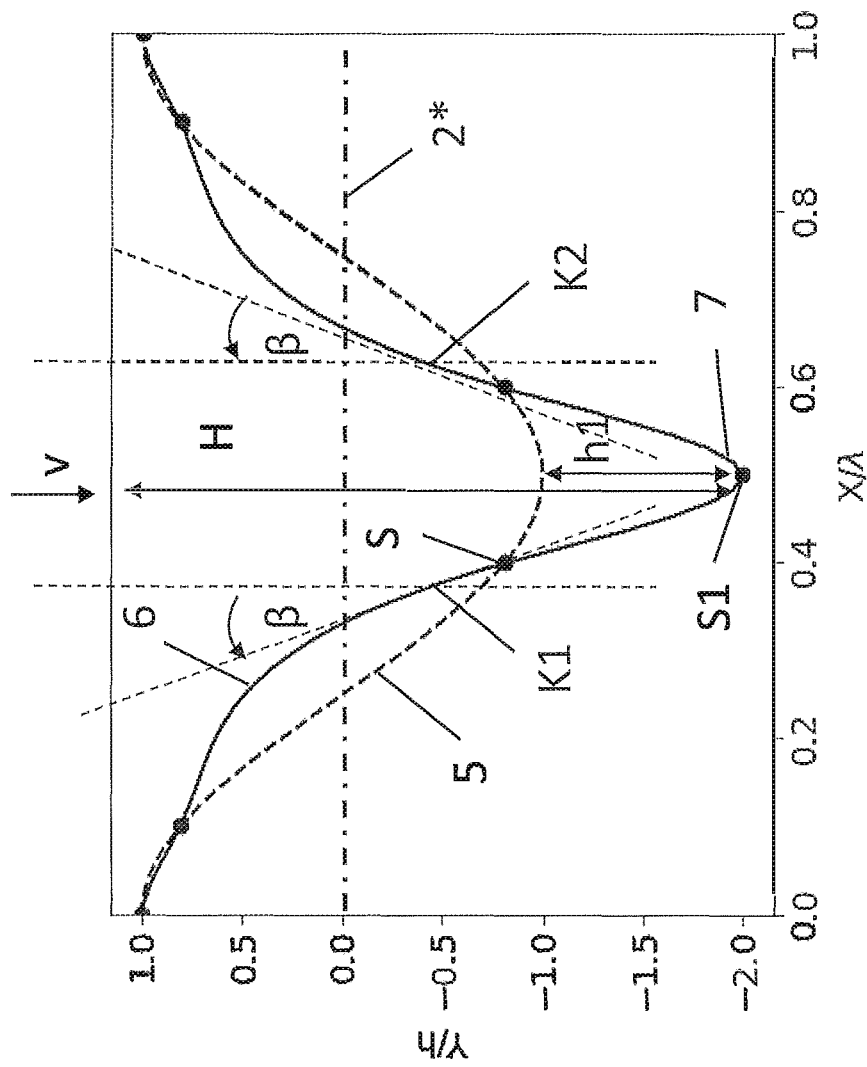
FIG. 3 is a schematic view of a sine waveform of a wave at the inflow edge and a waveform modified in relation thereto, that extends through support points of the sine wave, variants having inflection points and deeper-cut wave trough.

A measure is described for how the waveform at the inflow edge can be derived or optimized starting from a sine wave. The waveform is defined over multiple support points S of the sine curve and the curve profile results by a spline interpolation. For this purpose, FIG. 3 shows a schematic view of an imaginary sine waveform 5, at the inflow edge, and a modified waveform 6. The modified waveform 6 extends through six support points S on the sine wave 5 and an additional support point S1 in the middle of the wave. The peak-trough value H of the wave 6 is the distance from the highest point to the lowest point. The deviation from the sine wave is defined by a length h1 and the selection of the support points S. This waveform 6 causes a "deeper-cut" wave trough 7 of the waveform 6 with respect to the peak-trough value H.

In comparison to the sine waveform, the two flanks (K1, K2) dropping toward the wave trough 7 are located closer together and their angle of attack is steeper in relation to the sine wave with respect to the direction of the inflow speed v. The effective inflow velocity, i.e., the component of the inflow speed v perpendicular to the inflow edge, with which the disturbance strikes on the inflow edge of the fan blade, is reduced with a steeper profile of the edge. This results in more effective reduction of the emitted sound. Preferred values for h1 are preferably in the range of 0<h1<h with h=amplitude of the sine wave.

Figure 4:
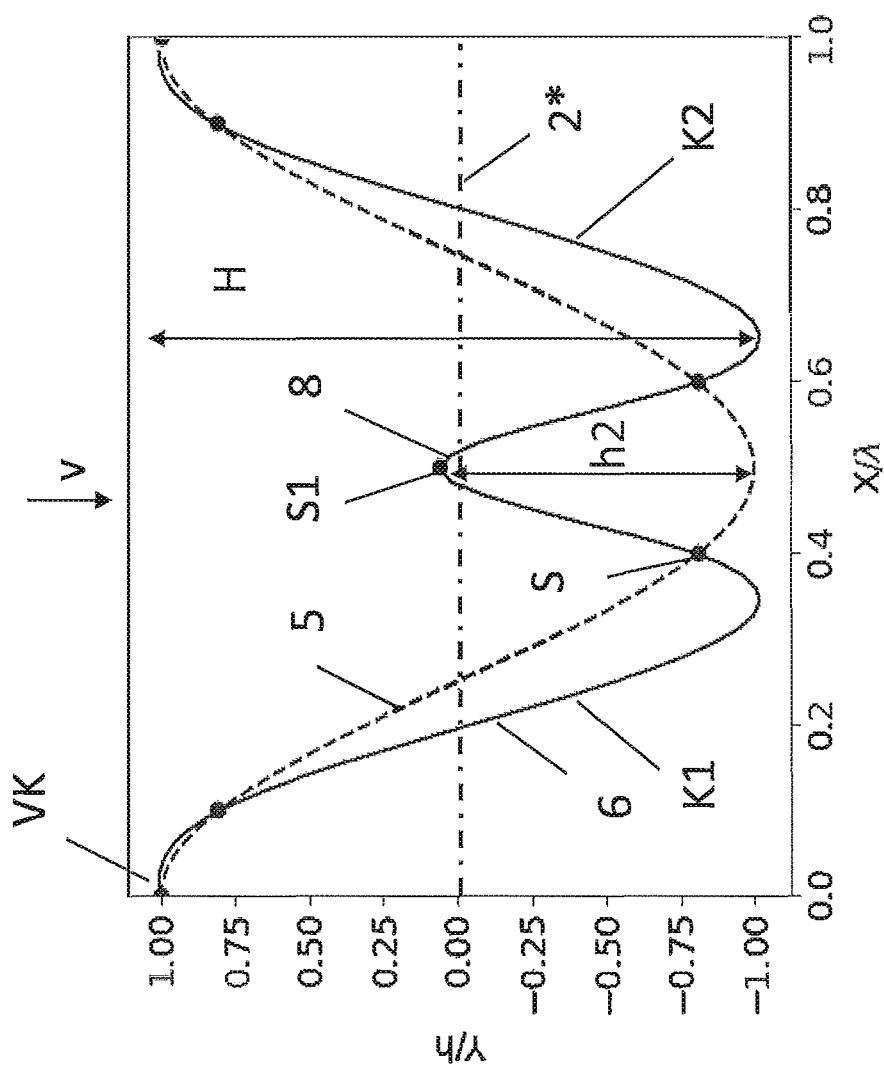
FIG. 4 is a schematic view of a sine waveform of a wave at the inflow edge and a waveform modified in relation thereto, that extends through support points of the sine wave, variants having additional wave peak between two wave troughs.

FIG. 4 shows a further alternative variation of the location of the support points. The support point in the middle of the wave is positioned upstream against the inflow direction, so that an additional wave peak 8 results in the middle of the wave. The deviation from the sine wave is defined by a length h2 and the selection of the support points S. Preferred values for h2 are in the range of 0<h2<2h with h=amplitude of the sine wave.

Figure 5:
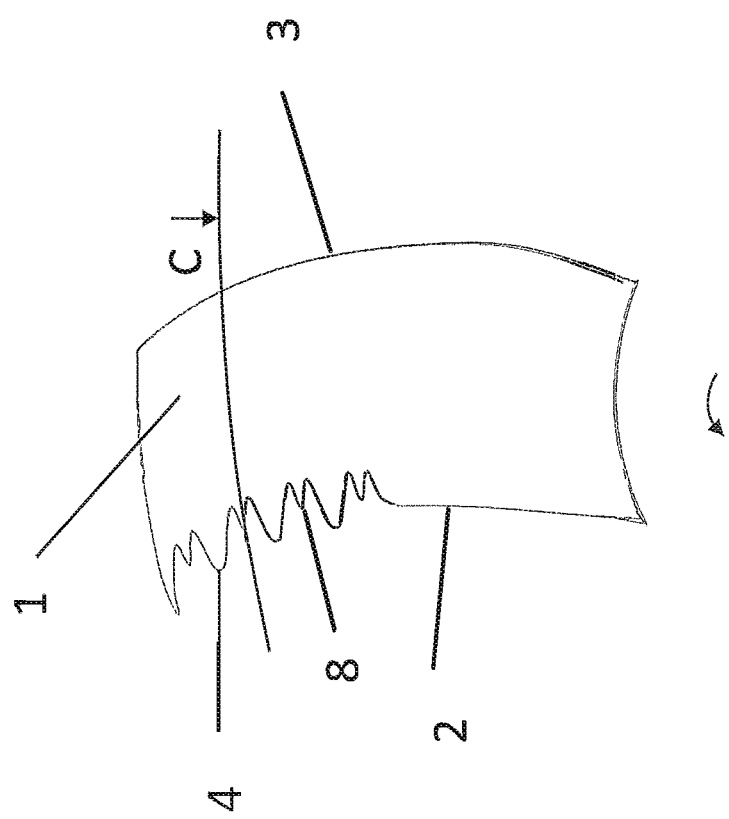
FIG. 5 is a perspective view of a fan blade with an inflow edge wavy in sections having additional wave peaks.

FIG. 5 shows an embodied fan blade 1 with an inflow edge 4 wavy in sections having additional wave peaks 8. This circumferentially extending profile section shown, having the profile section line C, is selected so that it extends through an additional wave peak 8 of the family 1 having the wavy input edge 4.

Figure 6:
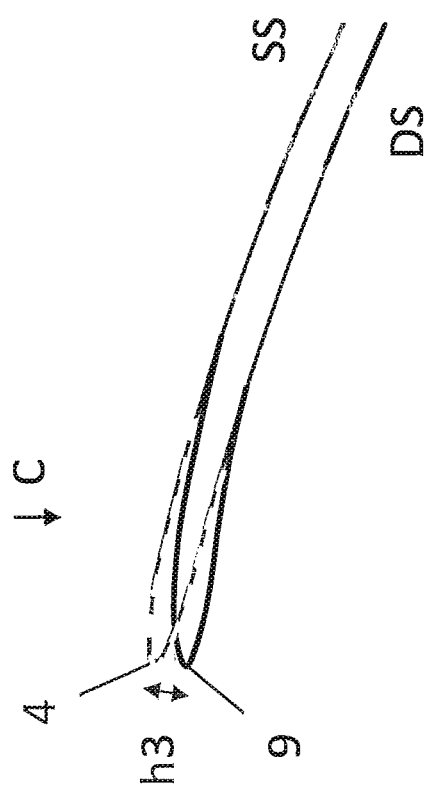
FIG. 6 is a detail cross-section view of a profile section to the family to explain the adaptation of the flow angle at half wavelength.

FIG. 6 is a detail view of the profile section C in the region of the wavy inflow edge of the fan blade 1 to explain a local adaptation of the blade profile in the region of the inflow edge to the inflow. The profile section is shifted in the region of the regional inflow edge 4 essentially perpendicularly to the center line between pressure side and suction side of the blade by the length h3 in the direction of the pressure side DS. The profile section adapted with a modified inflow edge 9 prevents flow separations and noise emissions. The described advantageous adaptation of the profile section is preferably in the middle of the wave, i.e., it can be located both in the region of the additional wave peak 8 and also in the region of the trough 7.

Figure 7:
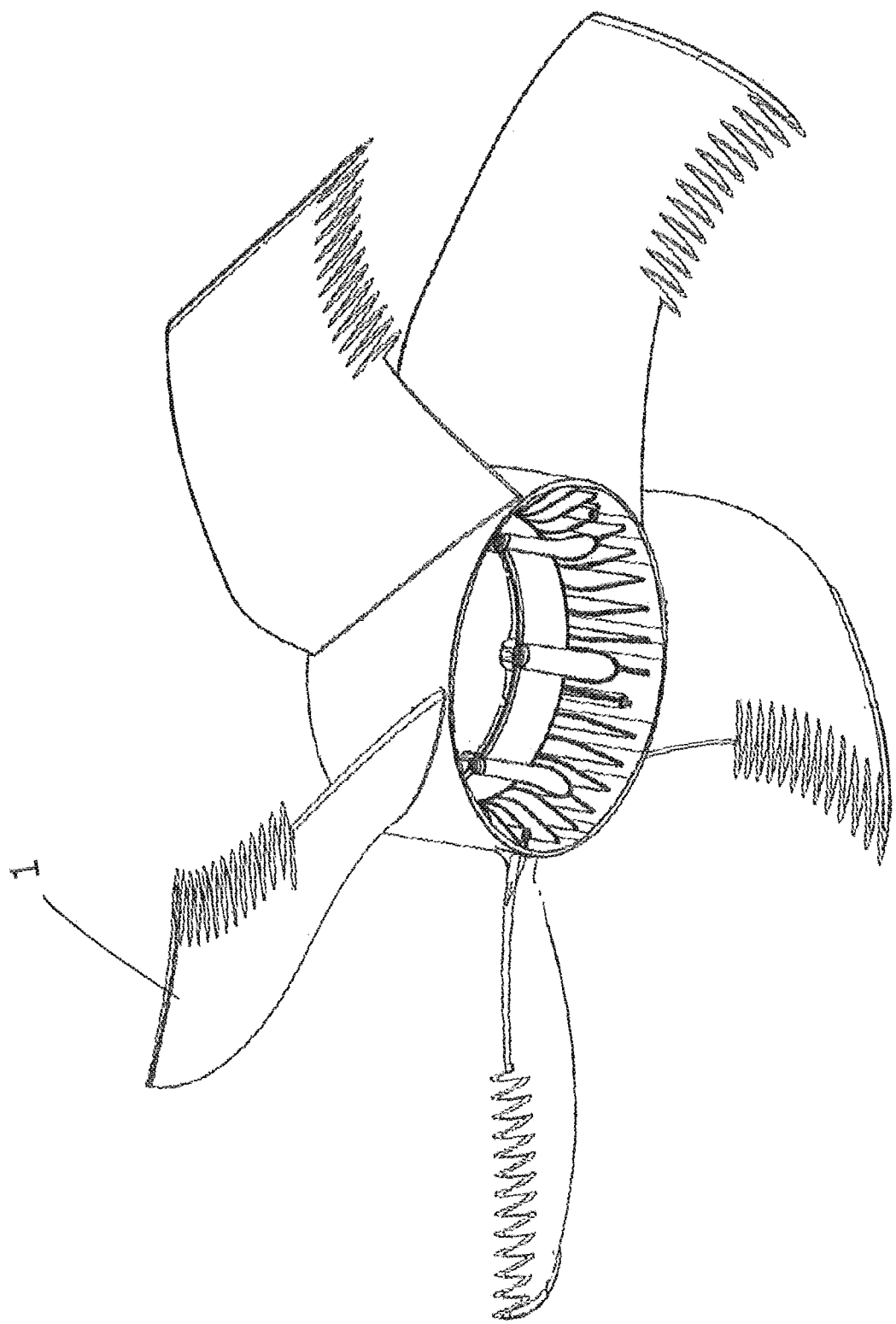
FIG. 7 is a perspective view of an exemplary axial fan having five fan blades.

FIG. 7 shows an exemplary axial fan having five fan blades 1.

Figure 8:
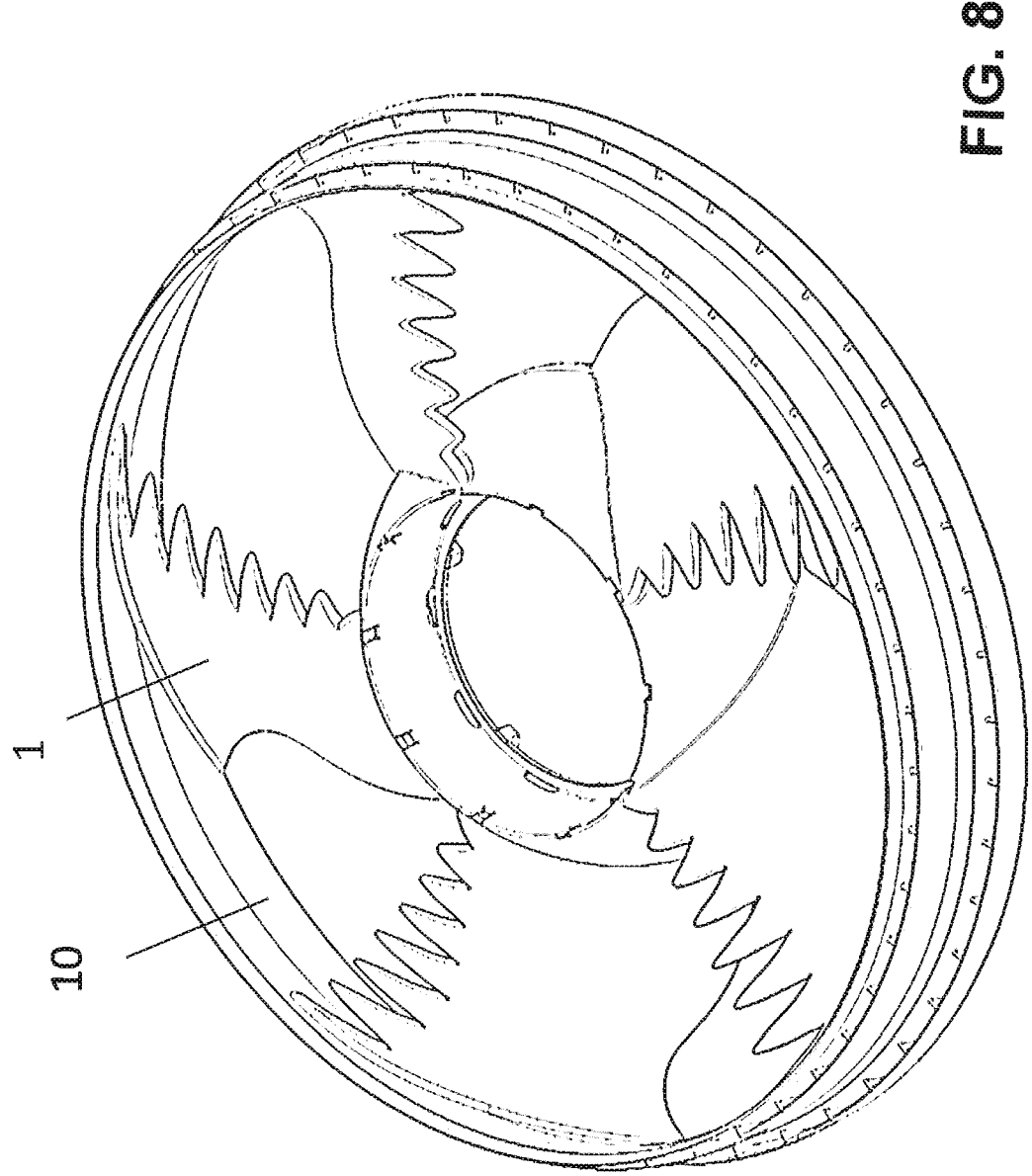
FIG. 8 is a perspective view of an exemplary diagonal fan with a circumferential ring having five fan blades.

FIG. 8 shows an exemplary diagonal fan having circumferential ring 10 having five fan blades 1.

The disclosure is not restricted in its embodiment to the above-described preferred exemplary embodiments. Rather, a number of variants is conceivable, that makes use of the described solution even in fundamentally differently designed embodiments.

The invention claimed is:

1. A fan blade for a radial fan comprising:
  an inflow edge and an outflow edge on the blade for the radial fan, the fan blade has, at least in one section of the inflow edge, a wavy inflow edge having a periodically repeating waveform of a period length $\lambda$, that is different from a sinusoidal waveform, and it is different from a sinusoidal waveform having equal period length $\lambda$;
  the repeating waveform forms per period two adjacent wave troughs between two flanks extending toward one another obliquely to a flow direction and the two adjacent wave troughs have the same amplitude and/or depth;
  a wave peak is located between the two adjacent wave troughs, the wave peak extends against the flow direction in the direction of an inflow-side front edge and a peak-trough value of the wave of the wave peak that is directly between the two adjacent wave troughs, is an absolute value approximately 10% to 80% of a peak-trough value of the directly adjacent wave peak(s); and the blade profile, at least viewed in a profile section in a region of the wave peak, respectively has a bump protruding out of the suction side and a dent at the corresponding opposite position of the pressure side, a surface profile is respectively defined so that a surface curvature changes twice viewed in the flow direction.

2. The fan blade as claimed in claim 1, wherein the wavy inflow edge has two or more of the periodically repeating waveforms.

3. The fan blade as claimed in claim 1, wherein the peak-trough value H of the wave, measured from a front edge in the region of the wavy inflow edge to a wave trough, has values viewed in the flow direction in relation to the period length $\lambda$, that are in the range $0.2 \leq \lambda/H \leq 2$, wherein the values can vary along the inflow edge.

4. The fan blade as claimed in claim 1, wherein the fan blade, in the region of the wavy inflow edge, has a chord length SL and the peak-trough value H in the region of the wave troughs is 10% of 30% of the chord length SL.

5. The fan blade as claimed in claim 1, wherein obliquely extending wave flanks extend in or close to their flank middle in relation to the flow direction at a tangential angle $\beta$ between 15° and 35.

6. The fan blade as claimed in claim 1, wherein the wavy inflow edge, insofar as it has a non-wavy region, at least in a region of provided wave peaks, protrudes against the flow direction in relation to the inflow edge in the non-wavy region.

7. The fan blade as claimed in claim 1, wherein the blade profile, viewed frontally in the region of the inflow edge in a profile section, curves toward the pressure side in comparison to a or the region adjacent thereto that curves less toward the pressure side from period center to period center.

8. The fan blade as claimed in claim 1, wherein the fan blade is porous at least in an area adjacent the inflow edge, having a connection from pressure side to suction side, with a plurality of channels extending through the fan blade.

9. An axial fan or diagonal fan having at least one fan blade as claimed in claim 1.

* * * * *